(12) United States Patent
Feierabend et al.

(10) Patent No.: US 7,815,033 B2
(45) Date of Patent: Oct. 19, 2010

(54) CONVEYOR FOR ORIENTING AND FEEDING SMALL PARTS

(75) Inventors: Markus Feierabend, Heuchelheim (DE); Stefan Lippert, Hungen (DE); Hugo Walldorf, Roedgen (DE)

(73) Assignee: Newfrey LLC, Newark, DE (US)

( * ) Notice: Subject to any disclaimer, the term of this patent is extended or adjusted under 35 U.S.C. 154(b) by 275 days.

(21) Appl. No.: 11/869,112

(22) Filed: Oct. 9, 2007

(65) Prior Publication Data
US 2008/0087523 A1    Apr. 17, 2008

(30) Foreign Application Priority Data
Oct. 9, 2006    (DE) .................. 10 2006 048 025

(51) Int. Cl.
*B65G 25/00*    (2006.01)
(52) U.S. Cl. .................. 198/409; 198/389; 198/390; 198/413
(58) Field of Classification Search .............. 198/389, 198/390, 409, 413, 397.06
See application file for complete search history.

(56) References Cited

U.S. PATENT DOCUMENTS

| | | | | |
|---|---|---|---|---|
| 3,474,891 A | * | 10/1969 | Kamila ................ | 198/397.01 |
| 3,731,783 A | * | 5/1973 | Dreher et al. ................ | 198/398 |
| 4,782,588 A | * | 11/1988 | Jangaard ................ | 29/810 |
| 5,333,718 A | * | 8/1994 | Pannell et al. .......... | 198/397.06 |
| 5,702,030 A | * | 12/1997 | Hulscher ................ | 221/254 |
| 6,347,698 B1 | * | 2/2002 | Magari ................ | 198/771 |

FOREIGN PATENT DOCUMENTS

| | | |
|---|---|---|
| DE | 44 13 017 A1 | 10/1995 |
| DE | 199 43 164 A1 | 3/2001 |
| FR | 2092750 | 1/1972 |

* cited by examiner

*Primary Examiner*—Joe Dillon, Jr.
(74) *Attorney, Agent, or Firm*—Michael P. Leary

(57) ABSTRACT

A conveyor for orienting and feeding small parts has a platform elevator conveying mechanism on one side of an inclined collecting surface that feeds small parts to a conveying trough at a higher elevation. The conveying trough has a horizontal stationary storage platform and a movable pivoting platform that can pivot about an axis located at a delivery end of the conveying trough, between a position parallel to the storage platform and a position inclined to the horizontal. The storage platform is adjacent to the platform elevator conveying mechanism and has a storage surface inclined downward toward the pivoting platform, and the pivoting platform has a hollow throat adjacent to the edge of the storage platform.

17 Claims, 5 Drawing Sheets

CONVEYOR FOR ORIENTING AND FEEDING SMALL PARTS

CROSS-REFERENCE TO RELATED APPLICATION

This application claims the benefit of German Patent Application No. 10 2006 048025.2 filed Oct. 9, 2006, incorporated herein by reference.

BACKGROUND OF THE INVENTION

The invention relates to a conveyor for orienting and feeding small parts such as studs, pins, screws, and the like, having a platform elevator conveying mechanism that is arranged on one side of an inclined collecting surface and that feeds small parts to a conveying trough located at a higher elevation.

A conveyor of the specified type is known from DE 199 43 164 A1. In the prior art conveyor, the conveying trough is located in a fixed position immediately adjacent to the conveying platform of the platform elevator conveying mechanism and is inclined at such an angle to the horizontal that the small parts arriving in the conveying trough slide along the conveying trough to a delivery point of their own accord. However, with conveyors of this type there is the problem that, during upward transport by the conveying platform, parts that lie atop one another or have an unfavorable, upright position are transported to the conveying trough and then do not fall into the conveying trough in a manner that ensures trouble-free further conveyance. In particular, small parts such as screws or welding studs, which have a shank and a head with a diameter greater than the shank, tend to become tangled with one another so that they are not reliably singulated and oriented as they are conveyed upward, and can fall atop one another during delivery to the conveying trough, hindering further transport.

Moreover, there is known from FR 2,092,750 a conveyor for small parts wherein a horizontally oriented conveying trough in a funnel-shaped supply reservoir can be moved from a lower position near the bottom, through the supply of small parts, to a higher delivery position, and can then be pivoted into a position inclined to the horizontal for delivery, so that parts picked up by the conveying trough slide onto an inclined rail that continues further. In order to prevent small parts that are lying crosswise from being picked up by the conveying trough, the conveying trough in this conveyor is bordered on one side by a wall and is provided on the other side with a tipping edge whose spacing from the wall is less than half the length of the parts to be conveyed, so that they fall from the conveying trough before the conveying trough has reached the upper delivery position. However, with this prior art design it can happen that individual parts are picked up by the conveying trough in a standing orientation and are conveyed further in this incorrect orientation, thereby causing problems. It is also possible with this prior art device to pick up parts located one atop the other, especially when the parts are provided with a shouldered head.

In another conveying system for conveying and orienting screws, which is known from DE 4,413,017 A1, a supply reservoir is provided with a platform elevator conveying mechanism having a conveying platform that carries the screws upward along with it. The conveying platform has an outward-inclined carrier end face and is moved past a stationary upper end face that is inclined in the same direction downward toward the outside. The carrier end face of the conveying platform is designed to be inclined downward in a predefined transport direction, so that screws carried along by the upward motion of the conveying platform are individually discharged outward over the upper end face one at a time. On the outside, the discharged screws are caught by a funnel-shaped trough at whose open lower end is provided a vibratory conveying trough that orients the screws that arrive one at a time. This prior art conveying system is complicated and the conveying of the screws is harsh and noisy.

BRIEF DESCRIPTION OF THE INVENTION

An object of the invention is to provide a conveyor of the aforementioned type that avoids the cited disadvantages and permits trouble-free orienting and conveying of small parts.

In an embodiment of the conveyor of the invention, a conveying trough has a generally horizontal stationary storage platform and a movable pivoting platform that can pivot about an axis located at a delivery end of the conveying trough, between a position parallel to the storage platform and a position inclined to the horizontal. The storage platform is adjacent to the platform elevator conveying mechanism and has a storage surface inclined downward toward the pivoting platform. The pivoting platform has a hollow throat adjacent to the edge of the storage platform.

In the embodiment, the conveying trough is divided into two sections, namely a stationary storage platform and a pivoting platform. The motion of the pivoting platform that serves to convey the small parts causes parts that have arrived in the conveying trough in an incorrect orientation to be discharged from the conveying trough on the infeed side and fall back onto a collecting surface. Only parts that lie in the hollow throat of the pivoting platform oriented in the longitudinal direction are carried along as the platform pivots up, and can arrive at a rail that serves to further transport and further orient them. The invention is especially advantageous for studs or screws that have a shouldered head and thus tend to arrive in the conveying trough upright with the head down more frequently than is the case with purely cylindrical pins.

BRIEF DESCRIPTION OF THE DRAWINGS

The invention will be further described in conjunction with the accompanying drawings, which illustrate preferred (best mode) embodiments, and wherein.

DETAILED DESCRIPTION OF THE INVENTION

Figure 1:
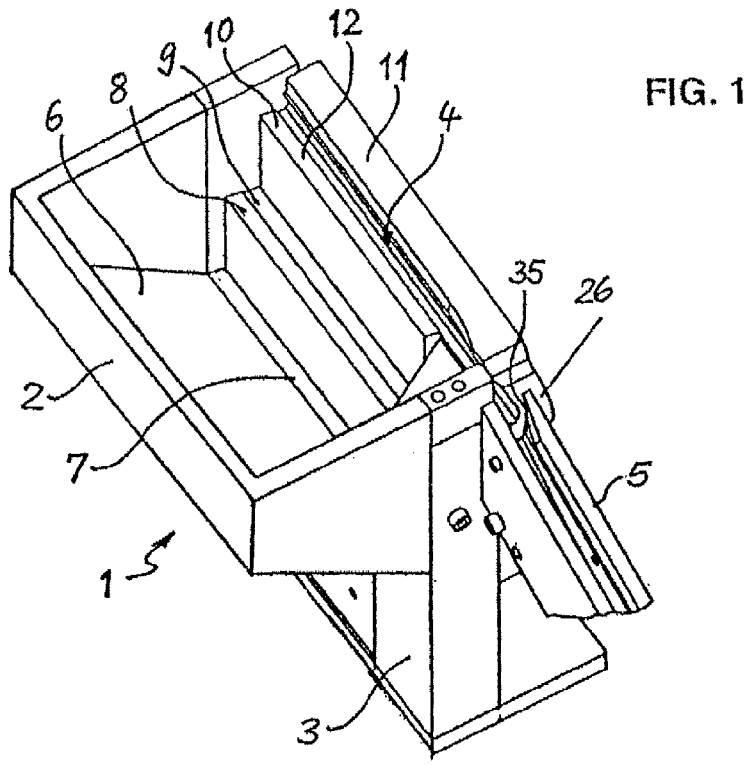
FIG. 1 is a perspective view of the feeding side of a conveyor according to the invention.

The conveyor 1 shown in FIG. 1 has a supply reservoir 2, a platform elevator conveying mechanism 3, a conveying trough 4, and a conveying rail 5. The supply reservoir 2 has a floor which forms a collecting surface 6 that is inclined downward toward the platform elevator conveying mechanism 3 and upon which the small parts, for example welding studs, slide toward the platform elevator conveying mechanism 3.

Figure 8:
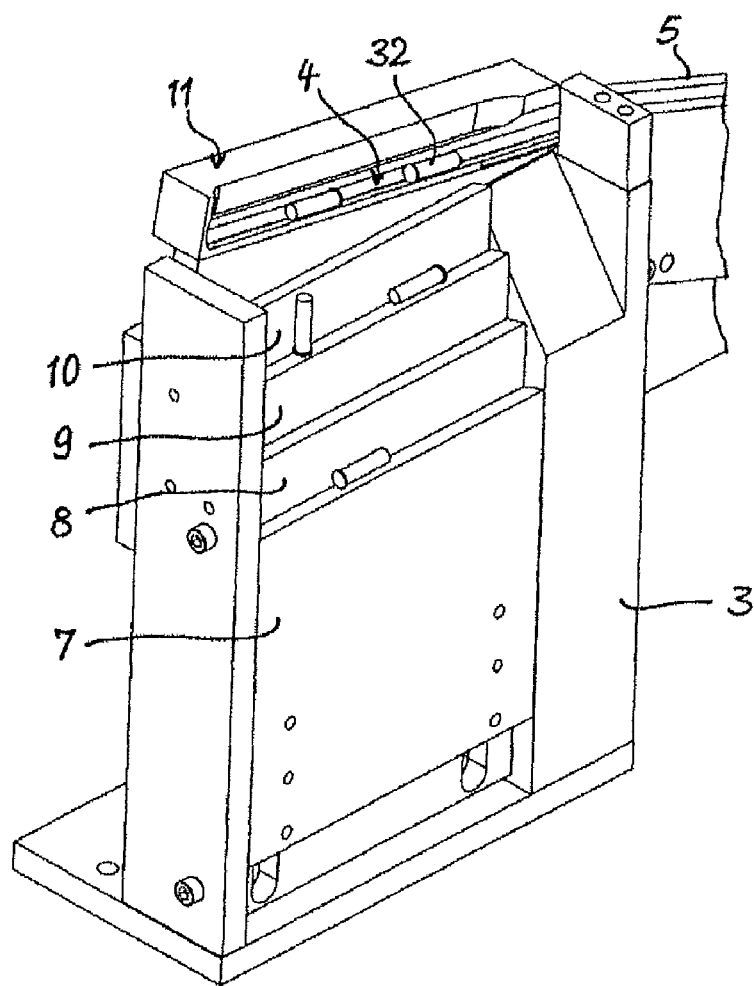
FIG. 8 is a perspective view of the conveyor of FIG. 2, shown without a supply reservoir and with pivoting platform 11 partially raised.

The lowest point of the collecting surface 6 terminates at a first conveying platform 7, which can be moved upward by a drive and which conveys the welding studs that have been advanced to a higher storage platform 8. Located on the side of the storage platform 8 facing away from the conveying platform 7 is a second conveying platform 9, which can be moved upward together with the conveying platform 7 and which receives the welding studs from the storage platform 8 and conveys them to the conveying trough 4. The conveying platforms 7, 9 and the storage platform 8 are flat plates, and their top faces form platform surfaces upon which the parts are conveyed. The platform surfaces are each inclined downward toward the next platform, so that the parts slide from one platform to the next when adjacent platforms are located at the same level. In the longitudinal direction, the platform surfaces extend essentially horizontally. As shown in FIG. 8, the thickness of the conveying platforms 7, 9 is dimensioned such that there is room in the transverse direction for only one part at a time on the platform surface, so that for the most part only parts that are oriented in the longitudinal direction of the platform surfaces are conveyed upward. Parts lying crosswise generally fall down when the conveying platforms are raised, but standing parts can be carried along and can sometimes arrive at the conveying trough 4 still standing.

Figure 4:
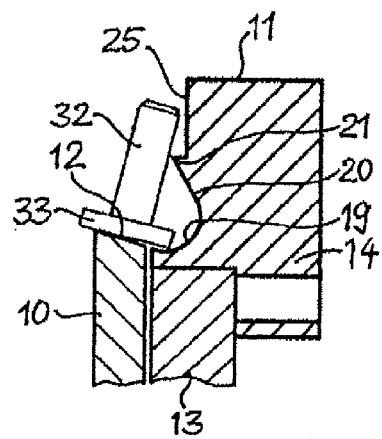
FIG. 4 is a fragmentary cross-section through the conveying trough of the conveyor of FIG. 1 with a stud located in a first incorrect orientation.
Figure 5:
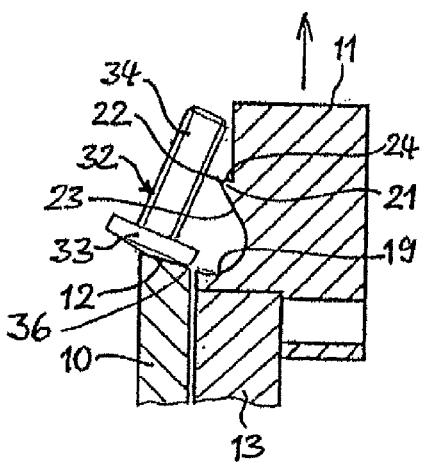
FIG. 5 is a fragmentary cross-section through the conveying trough of the conveyor of FIG. 1 with a stud located in a second incorrect orientation.

The conveying trough 4 includes two elements arranged next to one another, namely a stationary storage platform 10 and a movable pivoting platform 11. The storage platform 10 has a storage surface 12 that extends horizontally and is inclined downward toward an edge 36 adjacent to the pivoting platform 11, as shown in FIGS. 4 and 5. The inclination of the storage surface 12 is preferably 15° but may also be smaller or larger. The platform surfaces of the conveying platforms 7, 9 and of the storage platform 8 also preferably have an inclination of 15°.

Figure 3:
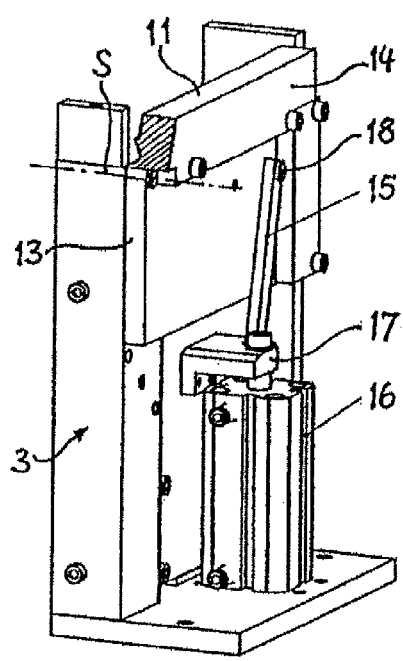
FIG. 3 is a perspective view of the drive side of the conveyor of FIG. 1.

The pivoting platform 11 includes a plate-like pivoting arm 13 and a rail 14. (see FIG. 6). The pivoting arm 13 is arranged laterally next to the storage platform 10 (see FIGS. 4 and 5), and the rail 14 is detachably attached by screws (not shown) to the top of the pivoting arm 13. At its top corner adjacent to the conveying rail 5, the pivoting arm 13 is mounted such that it can rotate about a horizontal pivot axis S (see FIG. 3) that is perpendicular to the plane of its plate. Through swivel joints, a push rod 15 connects the pivoting arm 13 to a drive device 16, which produces a linear drive motion parallel to the direction of motion of the conveying platforms 7, 9. The drive device 16 is connected by a coupling piece 17 to the conveying platform 9, which in turn is coupled to the conveying platform 7. The swivel joint 18 connecting the push rod 15 to the pivoting arm 13 can be attached to the pivot arm 13 at different points, each of which is a different distance from the pivot axis S, in order to be able to create different pivot angles for the same working stroke of the drive device 16.

Figure 6:
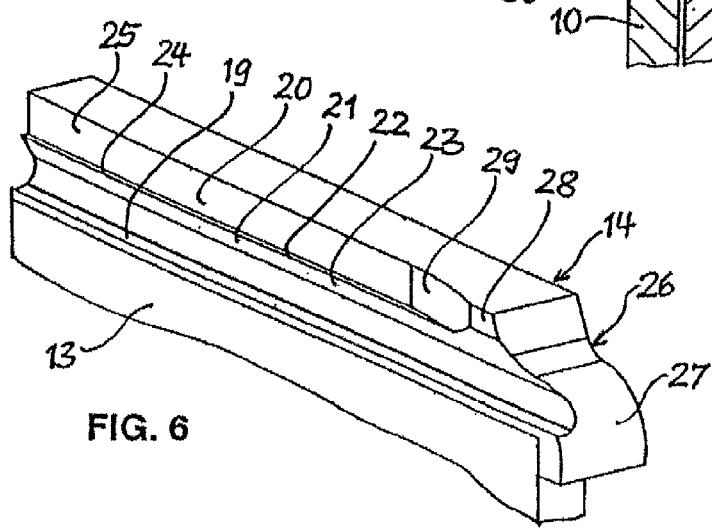
FIG. 6 is a perspective view of a removable rail of a pivoting platform of the conveyor of FIG. 1.

As is evident from FIGS. 4 through 6 especially, the rail 14 of the pivoting platform 11 has a hollow throat 19, and a wall 20, which extends upward from the hollow throat 19. Located on the wall 20 above the hollow throat 19 is a rib 21 with a sharp edge 22. The rib 21 is bounded on its side facing the hollow throat 19 by an inclined surface 23 receding toward the wall 20. The lower edge of this surface transitions with a concave curvature into the hollow throat 19. At the top, the edge 22 is bounded by a horizontal flat surface 24. A flat vertical surface 25 adjoins the rib 21 at the top. Above the rib 21, additional sharp-edged ribs may also be arranged one above the other.

The rail 14 has a delivery end 26 (see FIGS. 1 and 6), which is located on the pivot axis S and on which the parts are delivered from the rail 14 to the conveying rail 5. The delivery end 26 has a cylindrical end surface 27, whose axis coincides with the pivot axis S. The adjacent terminating end of the conveying rail 5 has a mating cylindrical concave surface 35 making contact with the end surface 27. In this way, a gap-free transition from the rail 14 to the conveying rail 5 is created that ensures unimpeded sliding of the parts from one rail to the next, because the tiny gap present at the transition remains constant during the pivoting motion.

Figure 2:
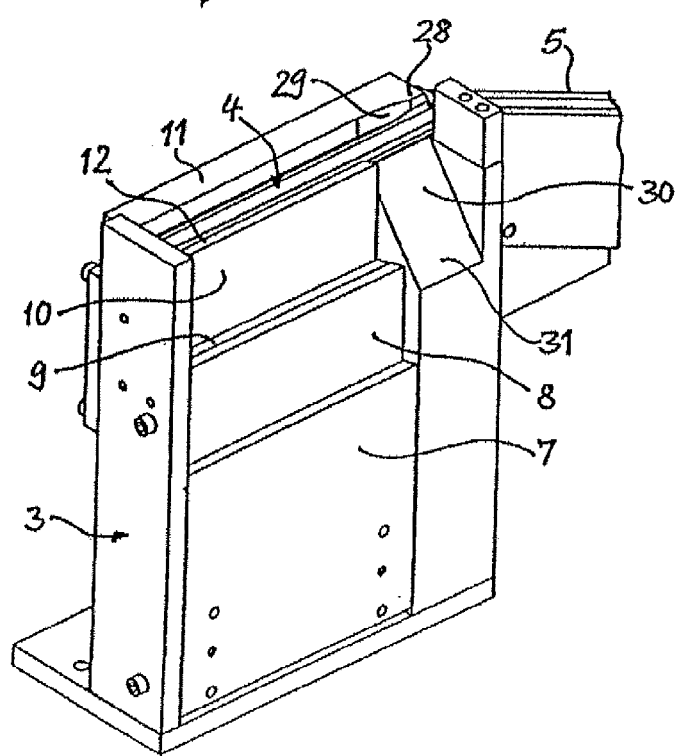
FIG. 2 is a perspective view of the conveyor of FIG. 1, shown without a supply reservoir and from a direction turned by approximately 90° from FIG. 1.

As shown in FIG. 6, near the delivery end 26, but still within the supply reservoir 2, the rail 14 has a projection 28 in the region of the surface 25. This projection has, on its side facing away from the delivery end, a ramp 29 which is inclined toward the surface 25 and whose distance from the wall 20 increases in the direction of motion. The projection 28 extends above the level of the rib 21. In the region of the ramp 29 and projection 28, the platform elevator conveying mechanism 3 has, immediately adjacent to the pivoting platform 11, a slide 30 with a sliding surface 31 inclined downward at an angle (see FIG. 2). In this way, parts that are pushed off the rail 14 by the projection 28 can fall down and be guided back onto the storage surface 6. The sliding surface 31 is arranged to be steep enough that the conveying platforms 7, 9 extend beyond the sliding surface when they are in their upper end position. In this way, parts lying on the slide 30 can be moved by the conveying platforms 7, 9 so that they slide back to the collecting surface better.

Figure 9:
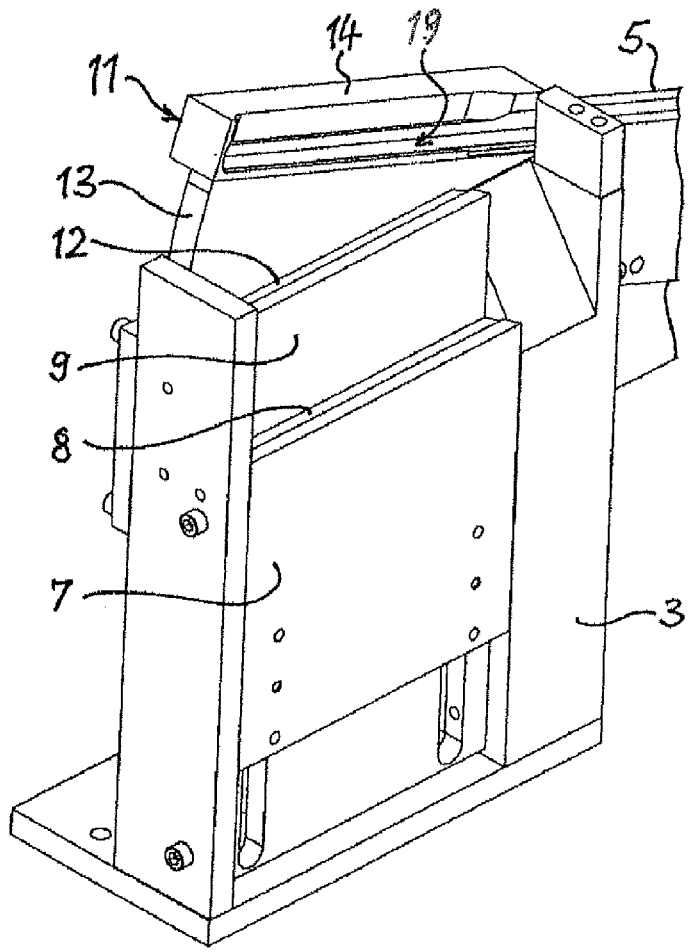
FIG. 9 is a perspective view of the conveyor of FIG. 2, shown without a supply reservoir and with pivoting platform 11 in the fully inclined position.

During operation of the conveyor 1, the conveying platforms 7, 9 are continuously moved up and down synchronously between the lower position shown in FIG. 1 and an upper position shown in FIG. 9 and determined by the height of the storage platforms 8 and 10. At the same rate, the pivoting platform 11 coupled to the drive device 16 of the conveying platforms 7, 9 is moved out of the horizontal position shown in FIG. 1 into an inclined position shown in FIG. 9, in which the hollow throat 19 of the pivoting platform 11 has approximately the same inclination as the conveying rail 5. As a result of the motion of the conveying platforms and the pivoting platform, parts 32, for example welding studs, located on the collecting surface 6 are conveyed upward into the conveying trough 4 and thence to the conveying rail 5. In this process, the action of the platform elevator conveying mechanism 3, and the special design of the conveying trough 4, orient the welding studs 32 such that they arrive at the conveying rail 5 with their longitudinal axes pointing in the direction of motion either with the head forward or with the shank forward, one after another, as shown in FIG. 8. During the upward motion, welding studs lying crosswise fall down from the moving platforms, and back to the collecting surface 6. However, as a result of their thicker head, welding studs or screws can be conveyed upward to the conveying trough 4 standing on their heads and impede delivery to the conveying rail 5. However, as described below, this is prevented with the described design of the conveying trough 4.

FIG. 4 shows a situation in which a welding stud 32 that was conveyed upward standing with its head 33 down has arrived in the conveying trough 4, with the head 33 being located partly on the storage surface 12 and partly in the hollow throat 19. The position of the pivoting platform 11 here corresponds to the lower position shown in FIG. 1. Now if the pivoting platform 11 is pivoted up, the welding stud 32 will be lifted on one side by the upwardly moving hollow throat 19 and tipped outward, so that it falls down over the edge of the storage platform 10. Further conveyance of the welding stud 32 toward the conveying rail 5, and resultant possible disruptions, are thus prevented.

FIG. 5 shows another possible conveying situation in which the head 33 of the welding stud 32 rests only on the storage surface 12. Depending on the length and inclination, the end of the shank 34 of the welding stud 32 may also rest on the surface 25. Now, if the pivoting platform 11 is pivoted upward in the direction of the arrow, the hollow throat 19 cannot tip the welding stud 32 outward. Instead, in this case the sharp edge 22 of the rib 21 engages with the shank 34, causing the welding stud 32 to be lifted and likewise tipped outward and dropped.

If a standing welding stud 32 should be conveyed further toward the delivery end 26 despite the measures described, the projection 28 and steeply downward dropping sliding surface 31 of the slide 30 in the area of action of the projection 28 ensure that the welding stud 32 loses its balance and falls downward without hindering the further conveyance of the correctly oriented welding studs following it. Further conveyance of the welding stud to the conveying rail 5 is accomplished solely through the pivoting of the pivoting platform upward into a position inclined to the horizontal and the sliding of the welding stud along the hollow throat as a result of its own weight. In its upward pivoted final position, the pivoting platform stands in an ideal position relative to the likewise inclined conveying rail 5, which accepts and further conveys the parts.

From the foregoing description of an embodiment of the invention, it is apparent that the embodiment has a number of advantageous features.

One advantageous feature of the invention provides that the pivoting platform has a wall adjacent to the hollow throat on the side away from the storage platform, with the wall extending upward over the hollow throat, wherein the wall has, on the side facing the hollow throat, the rib 21 with a sharp freestanding edge a distance away from the hollow throat.

Due to the arrangement of such a rib, studs or screws whose shank is provided with a thread or thread-like surface are gripped better by the upward-moving pivoting platform when they are located upright in the conveying trough but are not in engagement with the hollow throat. The sharp edge can be formed by two flat surfaces of the rib that enclose an angle in the range from 45° to 75° with one another.

The surface that adjoins the sharp edge on the side facing the hollow throat is inclined at an angle of 15° to 35°, preferably 30° to the vertical, such that the surface recedes in the direction of the wall 20 starting from the edge. In this embodiment, the rib then lies above the hollow throat, and the surface adjoining the rib provides for a delimiting of the free space over the hollow throat, so that small parts in an incorrect orientation, as well as parts lying one atop another, cannot enter the hollow throat. Other sharp-edged ribs can also be arranged above the rib in order to grip relatively long threaded shanks.

Another advantageous feature for improving the trouble-free operation of the inventive conveyor is that, near the delivery end 26 of the conveying trough 4, the wall 20 of the pivoting platform 11 has a projection 28 projecting over the hollow throat at a distance, and that a slide 30 with a sliding surface 31 that is inclined downward at an angle is provided in the area of action of the projection 28 next to the pivoting platform 11 and adjacent to the conveying and storage platforms. If the wall of the pivoting platform is provided with a rib 21, the projection preferably projects over and beyond the rib. The projection achieves the result that parts that are not discharged as the platform is raised despite being in an incorrect orientation are forced out of the hollow throat 19 so that they fall onto the slide 30 and slide thereon back to the collecting surface 6. The projection 28 preferably has an inclined ramp 29 whose distance from the wall 20 increases in the direction of motion, so that the parts that come into engagement therewith can easily slide off and do not remain hanging on the projection.

The slide 30 arranged in the area of action of the projection 28 can be set in vibratory motion by means of a suitable drive. In this way, small parts piling up in the area of the slide can be loosened and made to slide further into the working area of the platform elevator conveying mechanism.

The downward inclination of the storage surface 12 of the storage platform 10 toward the pivoting platform, and the adjacent edge of the hollow throat 19, can be inclined according to the invention at an angle of 5.degree. to 20.degree. to the horizontal. An inclination of this magnitude has proven to be especially useful. If the inclination is less, the parts do not reliably arrive in the hollow throat 19. If the inclination is greater, the risk of the parts lying upon one another and becoming entangled increases.

According to another feature, the part of the pivoting platform 11 forming the hollow throat 19 and laterally adjacent wall 20 is composed of a separate rail 14, which is removably attached to a pivoting arm 13. In this way it is possible to keep on hand differently formed rails 14 for different designs of small parts, the shape of the rails being optimized for the small parts in question. In addition, the delivery end 26 of the pivoting platform 11 has an end surface 27 designed as a surface of rotation coaxial to the pivot axis S, and which is abutted by a conveying rail 5 with a suitably shaped mating surface 35. This prevents a gap from arising between the pivoting platform and the conveying rail during the pivoting motion, in which the conveyed parts could get caught.

In order to keep down the cost of constructing the conveyor, the pivoting platform is coupled to a conveying platform of the platform elevator conveying mechanism by means of a transmission element. In this way the drive of the platform elevator conveying mechanism can also be used to move the pivoting platform. A push rod is provided as the transmission element, which can be attached in an articulated fashion to the pivoting platform at varying distances from the pivot axis. By moving the push rod linkage from one attachment point to another on the pivoting platform, the pivot angle of the pivoting platform can be changed.

The platform elevator conveying mechanism has multiple conveying platforms, with a stationary storage platform located between the conveying platforms. Improved preliminary orientation of the parts before they enter the conveying trough can be achieved by the use of such multiple conveying platforms.

With the conveyor described, precise feeding of the conveyed items to a singulation system connected to the conveying platform is achieved. The conveyed items are reliably pre-oriented for further singulation, and disruption of the conveying is largely avoided. The conveyor comes with a single drive, and therefore is economical. The conveyed items are conveyed in a gentle manner, and wear on the conveyed items is significantly less than in vibrating and drum conveyors. A further advantage is that the noise produced during operation is minor.

Figure 7:
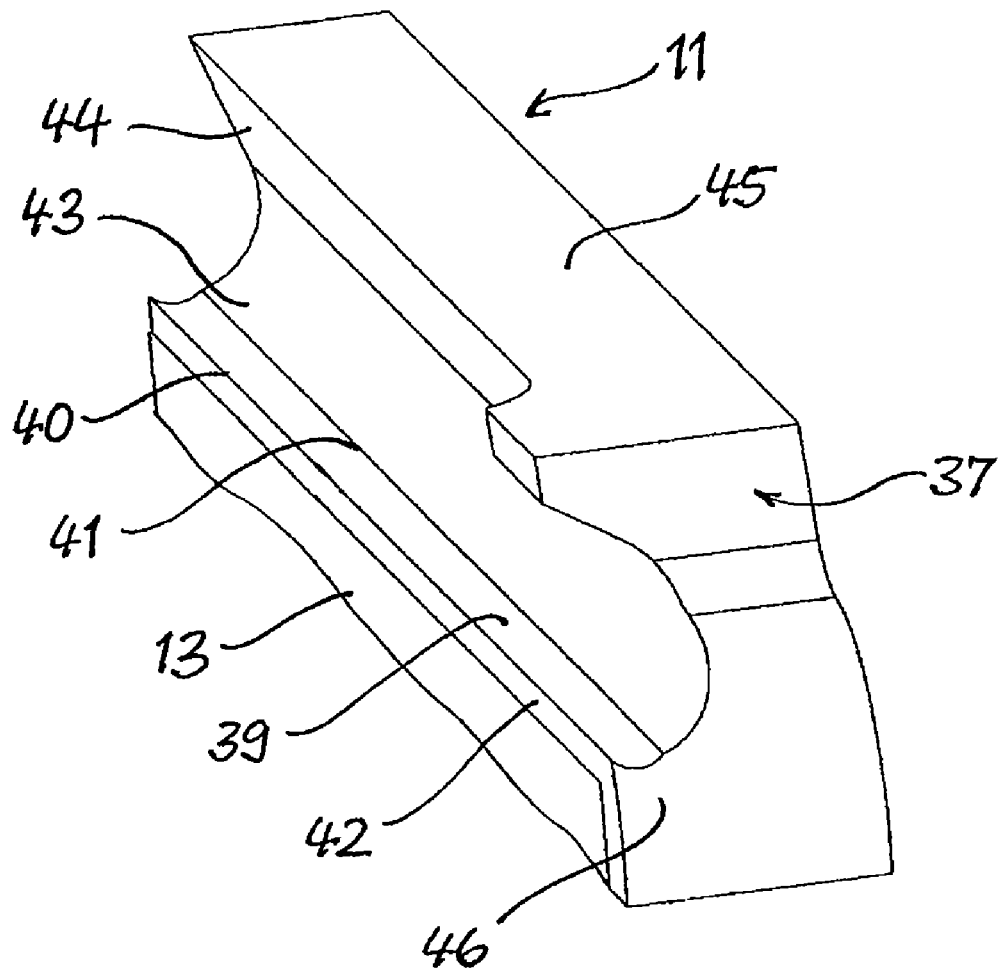
FIG. 7 is a perspective view of an alternative embodiment of a removable rail for the pivoting platform of the conveyor of FIG. 1.

FIG. 7 shows an alternative embodiment of a rail 37, which can be attached instead of the rail 14 to the plate-like pivoting arm 13 of the pivoting platform 11. The rail 37 has a hollow throat 39, which is delimited by two longitudinal edges 40, 41. The longitudinal edge 40 is located on the lateral delimiting surface 42, which is opposite the storage platform 10 and meets the hollow throat 39 at an acute angle. The longitudinal edge 41 is adjoined by a curved, concave surface 43, which extends upward and transitions essentially steplessly into a flat wall surface 44. The wall surface 44 extends to the top 45 of the rail 37. The hollow throat 39 has a smaller radius of curvature than the concave surface 43, and at the longitudinal edge 41, forms an obtuse angle of approximately 170° or less with the concave surface 43. At the delivery end 46 of the rail 37, the hollow throat 39 can be even deeper and have a correspondingly smaller radius of curvature.

As a result of the design of the rail 37 described, welding studs with a large head and small shank are stabilized further in their position on the rail 37, and the welding studs exhibit better sliding behavior on the rail 37 and better flow-in behavior at in-flow to the adjoining conveying rail 5. In the rail 37, in contrast to the rail 14, no acute-angled edge is provided on the wall surface 44 above the hollow throat 39. However, the rail 37 can also be provided with such an edge if needed.

While preferred embodiments of the invention have been shown and described, it will be apparent that changes can be made (such as modification or elimination of certain described features) without departing from the principles and spirit of the invention, the scope of which is defined in the following claims.

What is claimed is:

1. Conveyor for orienting and feeding small parts, having a platform elevator conveying mechanism that is arranged on one side of an inclined collecting surface at a first elevation and that feeds small parts to a conveying trough located at a second elevation higher than the first elevation, characterized in that the conveying trough has a stationary storage platform and a movable pivoting platform that can pivot about an axis located at a delivery end of the conveying trough, between a first position parallel to the storage platform and a second position inclined to the horizontal, wherein the storage platform is adjacent to the platform elevator conveying mechanism and has a storage surface inclined downward toward the pivoting platform, and wherein the pivoting platform has a hollow throat, and when in the first position the hollow throat is adjacent to an edge of the storage surface of the storage platform, and in the second position the hollow throat is pivoted upward and away from the storage surface of the storage platform.

2. Conveyor according to claim 1, characterized in that the pivoting platform has a wall adjacent to the hollow throat on a side away from the storage platform, with the wall extending upward over the hollow throat.

3. Conveyor according to claim 2, characterized in that the wall has, on a side facing the hollow throat, a rib with a projecting edge at a distance from the hollow throat.

4. Conveyor according to claim 3, characterized in that the edge is formed by two flat surfaces of the rib at an angle in the range from 45.degree. to 75.degree. with one another.

5. Conveyor according to claim 2, characterized in that the wall has a curved, concave surface, which forms an obtuse-angled edge with the adjacent hollow throat.

6. Conveyor according to claim 5, characterized in that the hollow throat has a smaller radius of curvature than the concave surface.

7. Conveyor according to claim 5, characterized in that the surface is inclined at an angle of 15.degree. to 35.degree. to the vertical, such that the surface recedes in the direction of the wall starting from the edge.

8. Conveyor according to claim 3, characterized in that the wall of the pivoting platform near the delivery end of the conveying trough has a projection projecting over the rib, and in that a slide with a sliding surface that is inclined downward at an angle is provided in the area of action of the projection.

9. Conveyor according to claim 8, characterized in that the projection has an inclined ramp whose distance from the wall increases in the direction of motion.

10. Conveyor according to claim 8, characterized in that the slide can be set in vibratory motion.

11. Conveyor according to claim 1, characterized in that the platform elevator conveying mechanism has two conveying platforms, wherein a stationary storage platform is located between the conveying platforms.

12. Conveyor according claim 8, characterized in that the conveying platforms of the platform elevator conveying mechanism are located laterally next to the slide, and at their upper end position they project over the sliding surface of the slide.

13. Conveyor according to claim 1, characterized in that the downward inclination of the storage surface of the storage platform toward the pivoting platform, and the adjacent edge of the hollow throat, are inclined at an angle of 5.degree. to 20.degree. to the horizontal.

14. Conveyor according to claim 1, characterized in that the part of the pivoting platform forming the hollow throat is composed of a separate rail, which is removably attached to the pivoting platform.

15. Conveyor according to claim 1, characterized in that the delivery end of the pivoting platform has an end surface that is a surface of rotation coaxial to the pivot axis, and that is abutted by a conveying rail with a mating surface.

16. Conveyor according to claim 1, characterized in that the pivoting platform is coupled to a conveying platform of the platform elevator conveying mechanism by means of a transmission element.

17. Conveyor according claim 16, characterized in that the transmission element is a push rod, which can be attached in an articulated fashion to the pivoting platform at varying distances from the pivot axis.

* * * * *